United States Patent
Daugherty (10) Patent No.: US 7,660,090 B1
(45) Date of Patent: Feb. 9, 2010

(54) APPARATUS AND METHOD FOR INPUT VOLTAGE TRANSIENT PROTECTION WITH A LOW-VOLTAGE RESET CIRCUIT

(75) Inventor: Kevin Michael Daugherty, Brighton, MI (US)

(73) Assignee: National Semiconductor Corporation, Santa Clara, CA (US)

( * ) Notice: Subject to any disclaimer, the term of this patent is extended or adjusted under 35 U.S.C. 154(b) by 168 days.

(21) Appl. No.: 11/845,678

(22) Filed: Aug. 27, 2007

(51) Int. Cl.
  *H02H 3/22* (2006.01)
(52) U.S. Cl. .................... 361/91.1; 361/111
(58) Field of Classification Search .......... 361/18, 361/23, 86, 91.1, 111
  See application file for complete search history.

(56) References Cited

U.S. PATENT DOCUMENTS

| 4,008,418 | A | 2/1977 | Murphy |
| 5,130,883 | A | 7/1992 | Edwards |
| 5,463,521 | A | 10/1995 | Love |
| 5,585,991 | A | 12/1996 | Williams |
| 5,793,127 | A | 8/1998 | Qualich |
| 6,331,767 | B1 | 12/2001 | Davies et al. |
| 6,606,227 | B2 | 8/2003 | Rapsinski et al. |
| 6,781,316 | B2 * | 8/2004 | Oda .......................... 315/88 |
| 6,998,818 | B2 * | 2/2006 | Xiong et al. ................ 320/134 |

OTHER PUBLICATIONS

LMV431/LMV431A/LMV431B Low-Voltage (1.24V) Adjustable Precision Shunt Regulators, National Semiconductor Corporation, May 2005, 16 pgs.
LMS33460 3V Under Voltage Detector, National Semiconductor Corporation, Mar. 2001, 6 pgs.
Yamamoto, S. et al., "Electrical Environmental Characteristics for Automotive Electronic Systems," IEEE Transactions on Vehicular Technology, vol. VT-32, No. 2, May 1983, pp. 151-160.
Over Voltage Protection Circuit for Automotive Load Dump, Application Note 1533, National Semiconductor Corportion, Dec. 2006, pp. 6.
Micro SMD Wafer Level Chip Scale Package, Application Note 1112, National Semiconductor Corporation, Jun. 2007, pp. 1-12.
U.S. Appl. No. 11/845,691, filed Aug. 27, 2007, "Apparatus and Method for Power Supply Overvoltage Disconnect Protection".
Efland, T., et al., "Load dump[automobiles]", Semicond. Group, Texas Instrum. Inc., Dallas, TX, USA, 1990 IEEE Workshop on Electronic Applications in Transportation, Oct. 18-19, 1990, Dearborn, MI, USA, 1990, pp. 73-78.

* cited by examiner

*Primary Examiner*—Danny Nguyen
(74) *Attorney, Agent, or Firm*—Darby & Darby P.C.; Matthew M. Gaffney (57) ABSTRACT

A circuit for voltage transient protection is provided. The circuit includes a voltage divider, a low-voltage reset circuit, and an input transistor. The input transistor receives an input voltage at the source of the input transistor, and provides a protected input voltage at the drain of the input transistor. The voltage divider provides a threshold voltage from the input voltage. The low-voltage reset circuit receives the threshold voltage. The low-voltage reset circuit causes the gate and source of the input transistor to short together when the low-voltage reset circuit is not in a reset state.

16 Claims, 9 Drawing Sheets

APPARATUS AND METHOD FOR INPUT VOLTAGE TRANSIENT PROTECTION WITH A LOW-VOLTAGE RESET CIRCUIT

FIELD OF THE INVENTION

The invention is related to transient protection/suppression, and in particular but not exclusively, to a method and circuit for using a low-voltage reset circuit to short the gate and source of an input transistor together when a voltage transient occurs.

BACKGROUND OF THE INVENTION

Over-voltage conditions can damage electronic devices, including transistors, regulators, and loads. High-voltage transient devices such as for automotive often use devices capable of operating with high voltages, so that the devices are not damaged during high voltage transients, such as load dump conditions.

A load dump condition may occur in an automobile due to an abrupt change in alternator load. For example, headlights being turned off, or the battery being disconnected from the battery post by a shock or mechanical vibration, may cause a load dump condition. The load dump condition may cause a large increase in voltage. The battery line, normally having a voltage of around 12 Volts, may have a voltage spike going to 50V or more during the load dump condition. To accommodate such high voltage spikes, devices capable of operating at such voltages may be used. However, such high-voltage devices are typically significantly more expensive and/or limited in availability.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a circuit for voltage transient protection. The circuit includes a voltage divider, a low-voltage reset circuit, and an input transistor. The input transistor receives an input voltage at the source of the input transistor, and provides a protected input voltage at the drain of the input transistor. The voltage divider provides a threshold voltage from the input voltage. The low-voltage reset circuit receives the threshold voltage. The low-voltage reset circuit causes the gate and source of the input transistor to short together when the low-voltage reset circuit is not in a reset state.

Figure 1:
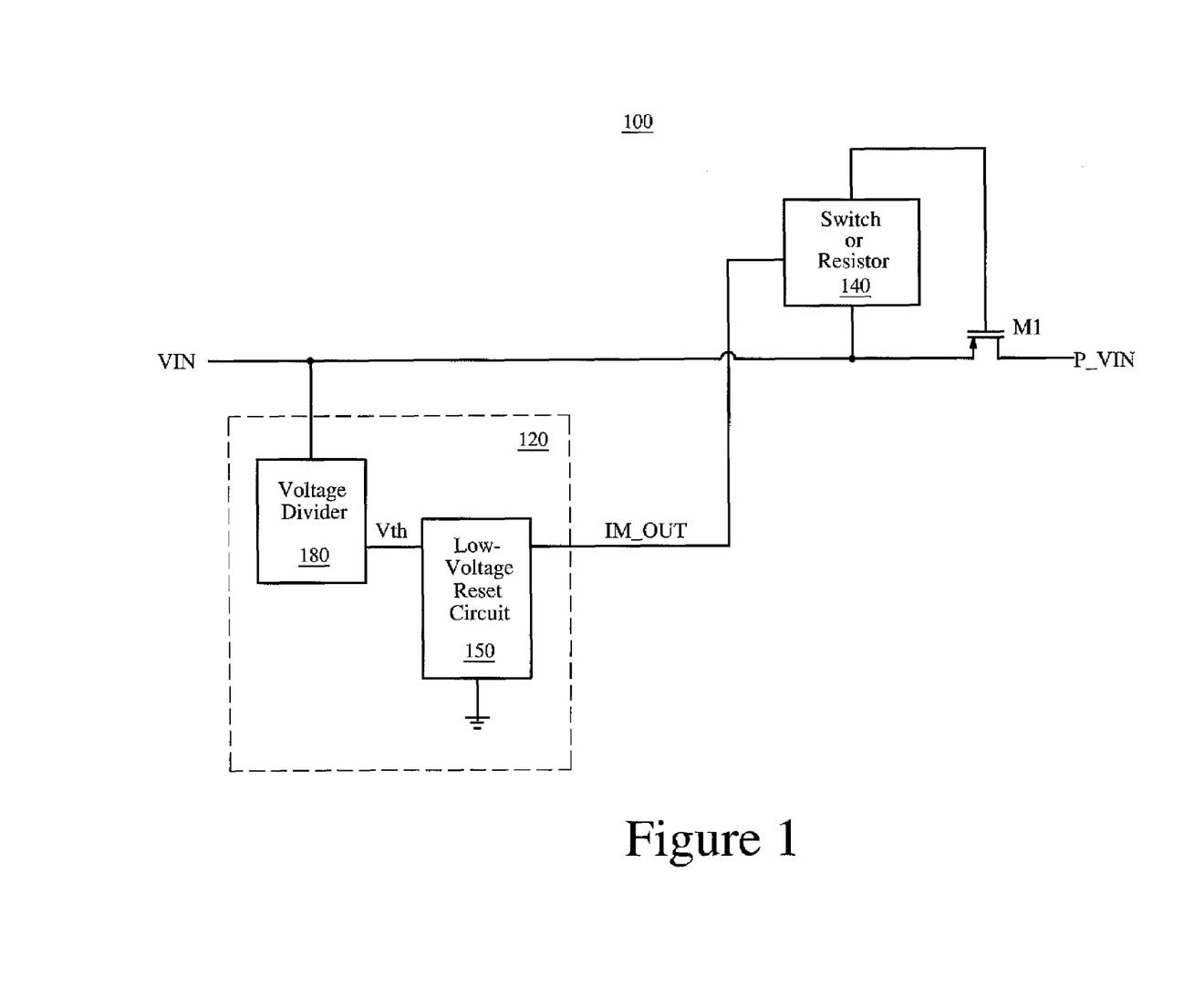
FIG. 1 shows a block diagram of an embodiment of a circuit, arranged in accordance with aspects of the present invention.

FIG. 1 shows a block diagram of an embodiment of circuit 100. Circuit 100 includes transistor M1, switch or resistor 140, and input monitor circuit 120. Input monitor circuit 120 includes voltage divider 180 and low-voltage reset circuit 150.

Transistor M1 is an input transistor that is arranged to receive input voltage VIN and to provide protected input voltage P_VIN. In one embodiment, input voltage VIN is the battery voltage line for an automobile. However, the invention is not so limited, and may also be suitably employed in virtually any high voltage transient environment, such as industrial applications or the like.

Input monitor circuit 120 is arranged to monitor input voltage VIN. If input voltage VIN reaches a pre-determined level (as adjusted by voltage divider and optionally hysteresis), input monitor circuit 120 asserts input monitor circuit output signal IM_OUT. Asserting input monitor circuit output signal IM_OUT in turn causes input transistor M1, which operates as a switch, to open by using switch or resistor 140 to short the gate of input transistor M1 to the source of input transistor M1. Input monitor circuit 120 includes low-voltage reset circuit 150, which asserts signal IM_OUT when low-voltage reset circuit 150 leaves the reset state. In some embodiments, low-voltage reset circuit 150 is active high, and in other embodiments, low-voltage reset circuit 150 is active low.

Voltage divider 180 provides threshold voltage Vth from input voltage VIN. Further, low-voltage reset circuit 150 is arranged to be in a reset state when threshold Vth is below a pre-determined reset voltage level (as adjusted by voltage divider and optionally hysteresis), and to be out of the reset state when threshold voltage Vth is above the reset voltage level (as may adjusted by hysteresis). When low-voltage reset circuit 150 leaves the reset state, it uses switch or resistor 140 to short the gate of input transistor M1 to the source of input transistor M1. For example, in one embodiment, switch or resistor 140 is a switch that is connected between the gate and source of transistor M1, and low-voltage reset circuit 150 causes the switch to close when low-voltage reset circuit 150 leaves the reset state.

In one embodiment, as illustrated in FIG. 1, the input transistor M1 is a P-channel MOSFET transistor. However, the invention is not so limited, and other embodiments of input transistor M1 are within the scope and spirit of the invention.

Figure 2:
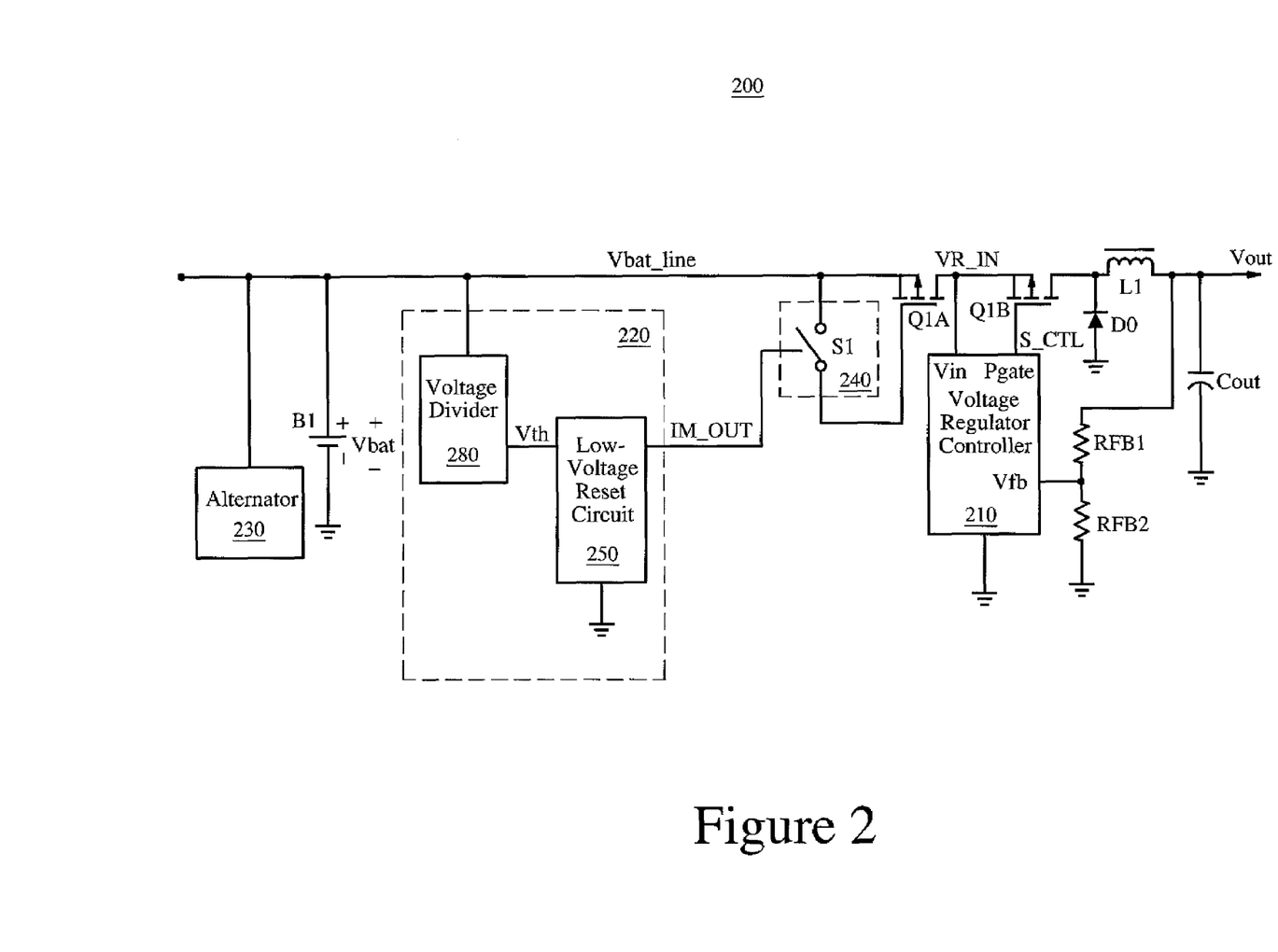
FIG. 2 illustrates a block diagram of an embodiment of the circuit of FIG. 1 illustrating one context for the circuit of FIG. 1, arranged in accordance with aspects of the present invention.

FIG. 2 shows a block diagram of an embodiment of circuit 200, which illustrates an automotive context for an embodiment of circuit 100 of FIG. 1.

Voltage regulator input voltage VR_IN is an embodiment of protected input voltage P_VIN of FIG. 1. Voltage regulator controller 210 is arranged to control conversion of voltage regulator input voltage VR_IN into regulated output voltage Vout. More specifically, voltage regulator controller 210 provides switch control signal S_CTL to control the regulation. In other embodiments, voltage regulator controller 210 may be a linear regulator controller rather than a switching regulator controller.

Circuit 200 further includes alternator 230, battery B1, transistor Q1B, diode D0, capacitor Cout, resistor RFB1, and resistor RFB2. Switch or resistor 240 includes switch S1. Transistor Q1A is an embodiment of transistor M1 of FIG. 1. Voltage regulator controller 210, in conjunction with transistor Q1B, diode D0, inductor L1, capacitor Cout, resistor RFB1, and resistor RFB2, operate together as a buck switching regulator, which converts voltage VR_IN to regulated output voltage Vout. Transistor Q1B is a high-side switch for the buck switching regulator. Voltage regulator 210 includes pin Pgate to provide switch control signal S_CTL to control high-side switch transistor Q1B.

In operation, voltage Vout is provided to power electronic circuits in an automobile that control loads such as headlights, seat motors, other motors, fans, and the like. Alternator 230 and battery B1 are connected to the battery line. Battery B1 provides battery voltage Vbat. The voltage on the battery line is battery line voltage Vbat_line. Battery line voltage Vbat_line is an embodiment of voltage VIN of FIG. 1. If battery B1 is disconnected from the battery line, a load dump condition may occur, causing a voltage spike on battery Vbat_line. If voltage Vbat_line exceeds a predetermined voltage level (19.25 V in one embodiment), then input monitor circuit 220 asserts signal IM_OUT, causing switch S1 to close In one embodiment, voltage regulator controller 210 is included on an integrated circuit. In one embodiment, voltage regulator controller 210 is included on an integrated circuit, and the other components of the voltage regulator are off-chip. However, in other embodiments, some of the other components of the voltage regulator may be included on the integrated circuit that includes voltage regulator controller 210. For example, in one embodiment, transistor Q1B and voltage regulator controller 210 are both included together in an integrated circuit, and in another embodiment, transistor Q1B is a discrete off-chip component.

Although FIG. 2 illustrates a particular context for which circuit 100 may be employed, as previously discussed, the invention is not so limited, and embodiments of circuit 100 may be used in other contexts as previously discussed.

Figure 3:
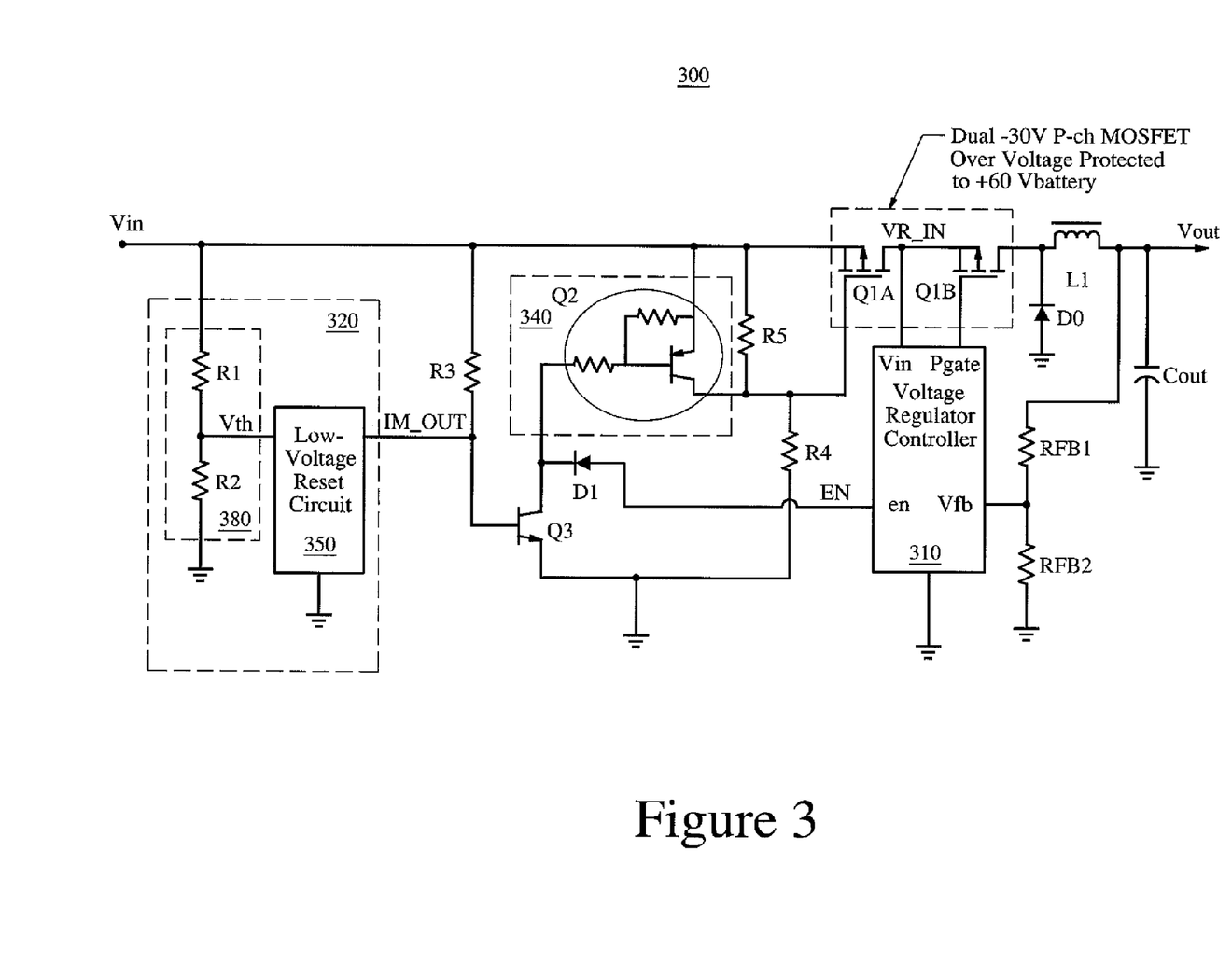
FIG. 3 shows a block diagram of an embodiment of the circuit of FIG. 1, arranged in accordance with aspects of the present invention.

FIG. 3 illustrates a block diagram of an embodiment of circuit 300, which may be employed as an embodiment of circuit 100 of FIG. 1. Circuit 300 may further include transistor Q1B, diode D0, capacitor Cout, resistor RFB1, and resistor RFB2, and switch or resistor 340 includes S1, which operate in a similar manner as described above with regard to FIG. 2. Also, circuit 300 may include transistor Q2, transistor Q3, diode D1, and resistors R3-R5. Transistor Q2 is an embodiment of switch S1 of FIG. 2. Voltage divider 380 includes resistor R1 and resistor R2.

In some embodiments of circuit 300, voltage regulator controller 310 also has an enable input (en). In some embodiments of circuit 300, input monitor circuit 320, in addition to controlling input transistor Q1A, also disables voltage regulator controller 310 when the input voltage reaches the pre-determined level.

When input voltage VIN reaches the pre-determined level (as adjusted by resistor divider and hysteresis), the gate and source of transistor M1 are shorted together, causing transistor M1 to operate as an open switch. However, if the voltage limit of transistor M1 is reached, transistor M1 breaks down, and operates essentially as a zener diode. However, by disabling voltage regulator controller 110, no current passes through transistor M1, and there is accordingly substantially no power through transistor M1. In this way, transistor M1 is not damaged even though it is in voltage breakdown.

In circuit 300, if input voltage VIN reaches the pre-determined level, the input voltage is disconnected from voltage regulator controller 310, and the voltage regulator controller is disabled so that no current is drawn through transistor M1 even if it is in voltage breakdown.

This topology potentially allows a voltage protection with twice the voltage limit of transistor M1. For example, a 30V part may be used for transistor M1, and provide 60V over-voltage protection. Or a 50V part may be used for transistor M1, and a 30V rated regulator to provide 80V over-voltage protection.

Although FIG. 3 illustrates an embodiment in which voltage regulator controller 310 is disabled by de-asserted the signal at the enable pin of voltage regulator controller 310, other ways of disabling voltage regulator controller 310 may also be employed. For example, in one embodiment, voltage regulator controller 310 is disabled by forcing the regulator voltage feedback pin high.

Resistors R1 and R2 operate together as a voltage divider to provide threshold voltage Vth from voltage Vin. Further, low-voltage reset circuit 350 is arranged to be in a reset state when threshold Vth is below a reset voltage level (as adjusted by resistor divider and hysteresis), and to be out of the reset state when threshold voltage Vth is above the reset voltage level (as adjusted by hysteresis). For example, in one embodiment, low-voltage reset circuit 350 is in a reset state when threshold voltage Vth is 3.0V or less (as modified by hysteresis). In one embodiment, when low-voltage reset circuit 350 is in the reset state, signal IM_OUT is logic low, and when low-voltage reset circuit 350 is out of the reset state, signal IM_OUT is high impedance (e.g. open drain). When low-voltage reset circuit 350 is high impedance, resistor R3 actively turns on transistor Q3. Also, resistors R1 and R2 may be suitably selected in order to select the desired pre-determined level. In the embodiment shown, signal IM_OUT is logic low when low-voltage reset circuit 350 is in the reset state. In one embodiment, R1 is pre-selected as 110 KiloOhms and resistor R2 is pre-selected as 21.7 KiloOhms. In this embodiment, low-voltage reset circuit 350 is reset as long as Vin is 18.2 V or less.

Transistors Q2 and Q3 operate as switches. When low-voltage reset circuit 350 leaves the reset state, resistor R3 turns on Q3, which in turn causes transistor Q2 to turn on. When transistor Q2 turns on, it shorts out the gate-source voltage on transistor Q1A. Additionally, transistor Q3 and diode D1 disable voltage regulator 310 when low-voltage reset circuit 350 leaves the reset state. Accordingly, there is no current flowing across either transistor Q1A or transistor Q1B because the regulator is off.

In one embodiment, as illustrated in FIG. 3, transistors Q1A and Q1B are included together in a dual MOSFET package. However, in other embodiments of circuit 300, transistor Q1B is integrated and included on the same integrated circuit as voltage regulator controller 310. Further, FIG. 3 indicates 30V MOSFETs with over voltage protection to 60V, but this is merely exemplary of one embodiment, and the invention is not so limited.

Resistor R5 is optional. For some applications, it is preferable to keep R5 in the circuit, and for other applications, it is preferable to omit R5 from the circuit.

Diode D1 is optional. In some embodiments, and the base of Q2 may be directly connected to the enable pin of regulator controller 310. In other embodiments, signal EN is not used at all.

Figure 7:
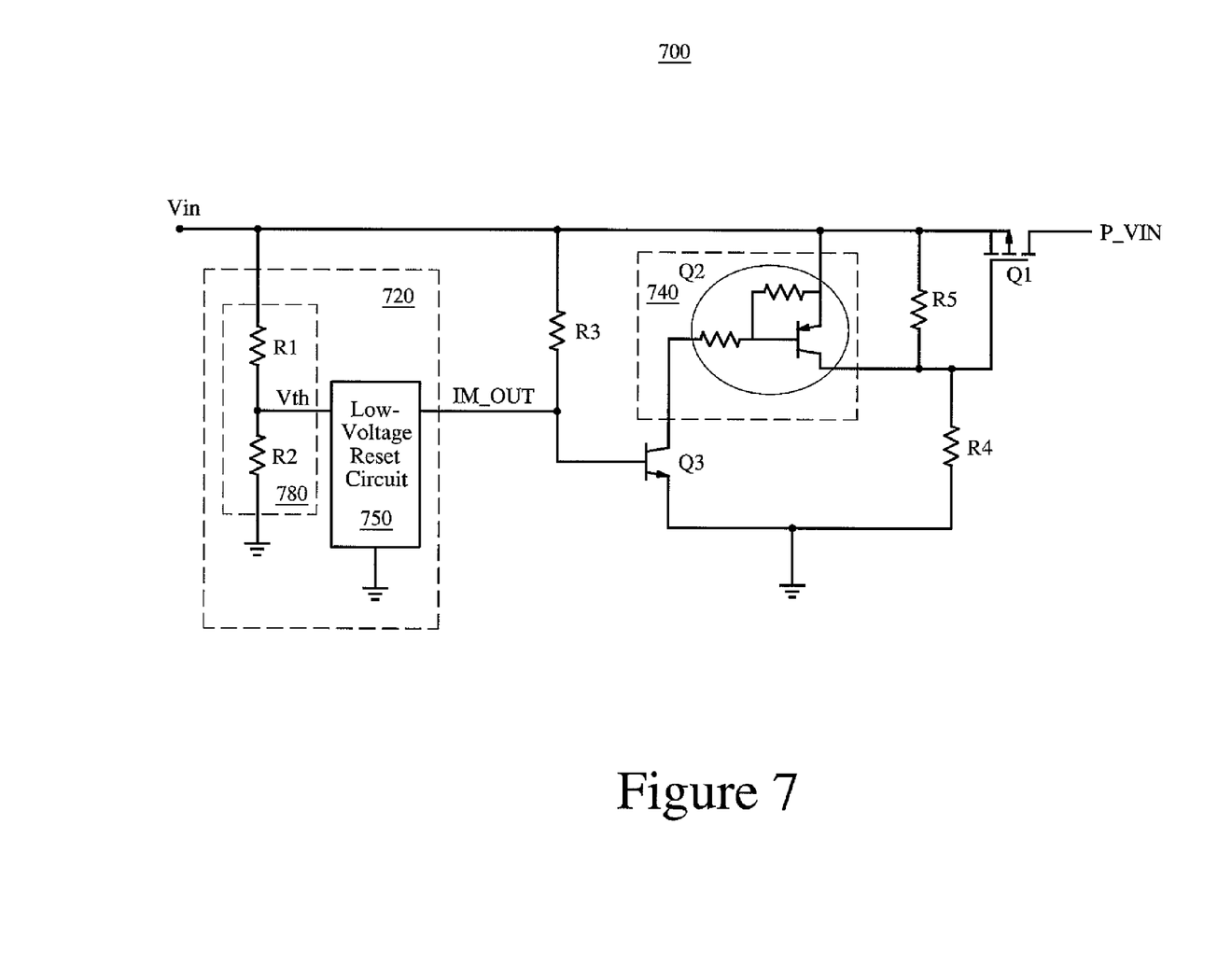
FIG. 7 shows a block diagram of yet another embodiment of the circuit of FIG. 1.

Although embodiments of the invention may be used for a voltage regulator, the invention is not so limited. The invention may be used in virtually any context in which voltage transient protection is desired, as shown in FIG. 7 in one embodiment.

Figure 4:
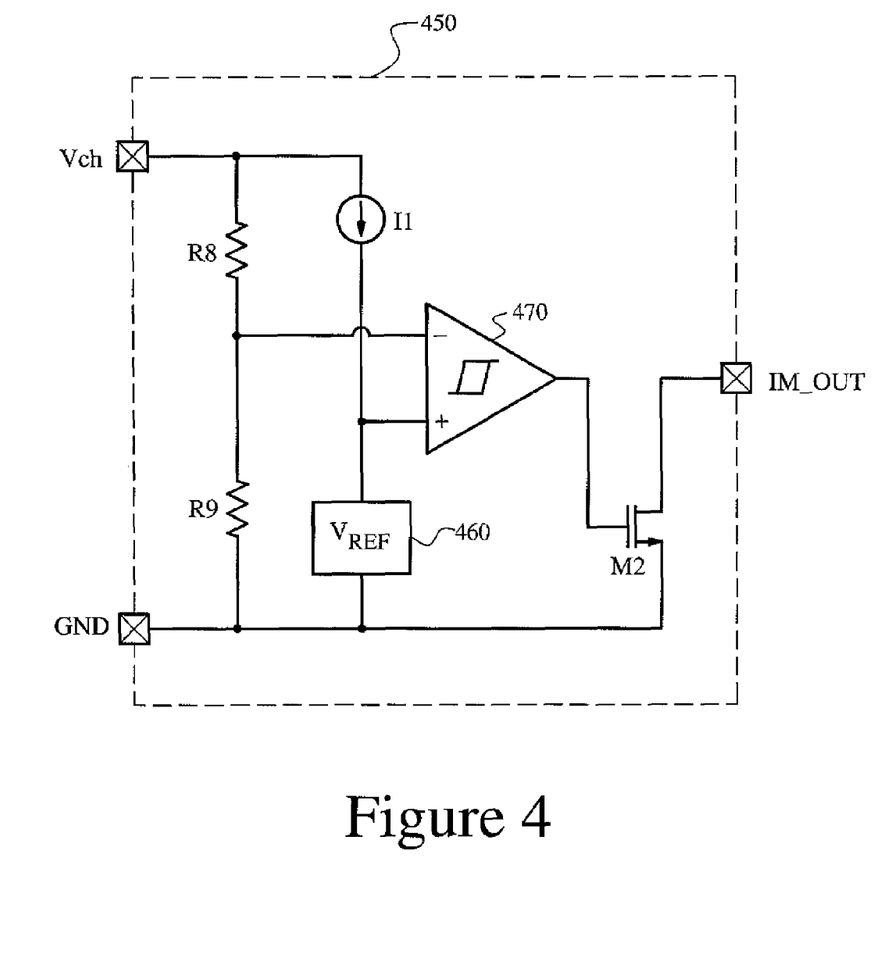
FIG. 4 illustrates a block diagram of an embodiment of the low-voltage reset circuit of FIG. 3.

FIG. 4 shows a block diagram of an embodiment of low-voltage reset circuit 450, which is one embodiment of a low-voltage reset circuit that may be used for low-voltage reset circuit 350 of FIG. 3. Low-voltage reset circuit 450 is a relatively small, simple three-pin integrated circuit with an integrated precision reference voltage, that operates at relatively small voltage (e.g. 1V) and relatively low current (e.g. 1 μA), and is commonly used for resetting digital circuits such as flash memory or a processor, or to indicate low battery voltage or a power failure condition, when the input voltage (e.g. the battery voltage) reaches an under-voltage condition (e.g. the input voltage is below 3.0V, as modified by hysteresis). One example of a low-voltage reset circuit is the LMS33460, available from National Semiconductor Corporation. The LMS33460 has a threshold voltage of 3.0V, with 115 mV of hysteresis. Of course, the low-voltage reset circuit may have more than three pins for purposes outside of the core functionality or may be internally connected. For example, the LMS33460 has five pins. The three primary pins are pin 3 (GND), pin 4 (OUTBAR), and pin 5 (VIN). Pin 1 is internally connected and should not be connected externally, and pin 2 is internally connected to ground, and should be either not connected externally or connected externally to ground. However, LMS33460 is still considered to be a "three-pin device", as that term is used herein, since two of the pins are internally connected.

Figure 5:
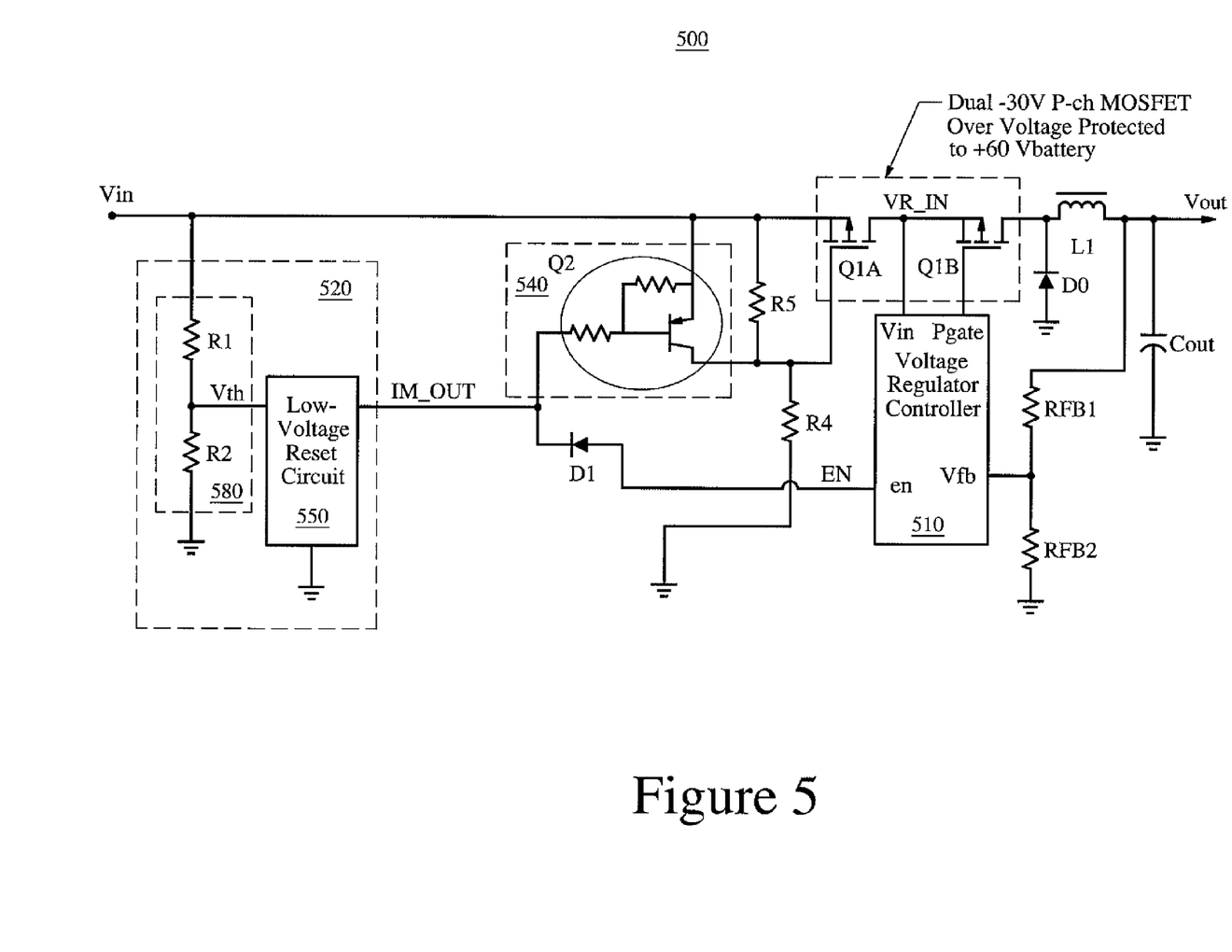
FIG. 5 shows a block diagram of another embodiment of the circuit of FIG. 1, arranged in accordance with aspects of the present invention.

FIG. 5 illustrates a block diagram of an embodiment of circuit 500, which may be employed as an embodiment of circuit 300 of FIG. 3. Circuit 500 is similar to circuit 300 of FIG. 3, albeit different in some ways. In circuit 500, low-voltage reset circuit 550 is an active high (open drain output) low-voltage reset circuit rather than an active low (open drain output) low-voltage reset circuit. By using an active-high (open drain output) low voltage reset, resistor R3 and transistor Q3 may be omitted from the circuit. Transistor Q2 is an embodiment of switch S1 of FIG. 2.

Figure 6:
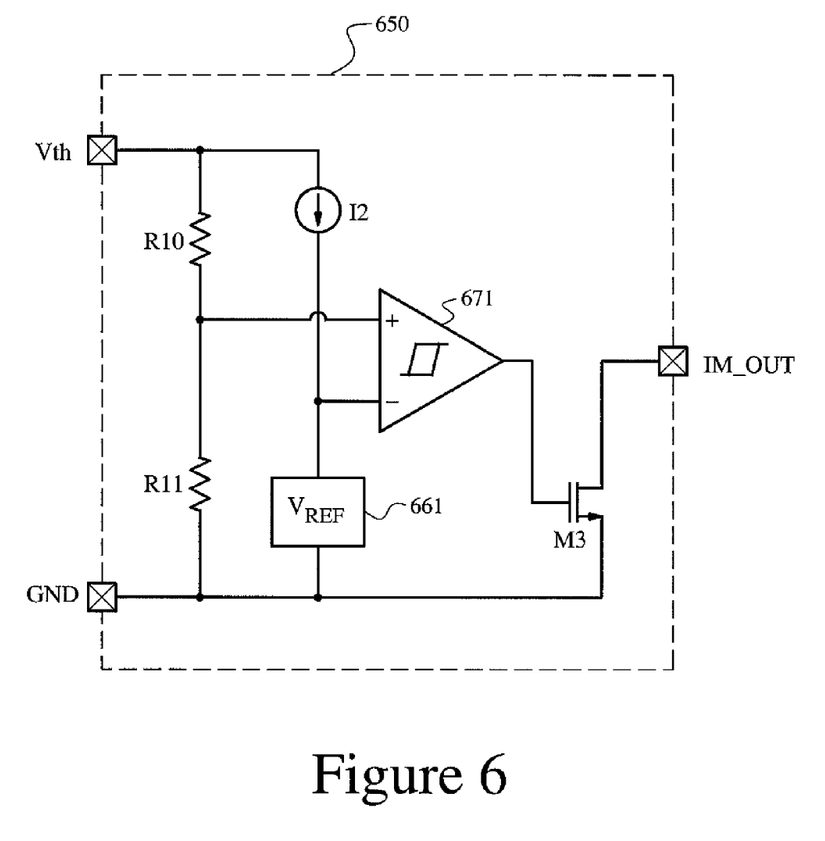
FIG. 6 illustrates a block diagram of an embodiment of the low-voltage reset circuit of FIG. 5.

FIG. 6 shows a block diagram of an embodiment of low-voltage reset circuit 650, which may be employed as an embodiment of low-voltage reset circuit 550 of FIG. 5. Transistor M3 in this embodiment is a high-voltage transistor (e.g. 30V, or greater than the maximum Vin over voltage trip level).

FIG. 7 shows a block diagram of an embodiment of circuit 700, which may be employed as an embodiment of circuit 100 of FIG. 1. Circuit 700 is similar to circuit 300 of FIG. 3, except that there is no regulator in circuit 700. Input transistor Q1 is an embodiment of input transistor M1 of FIG. 1.

Figure 8:
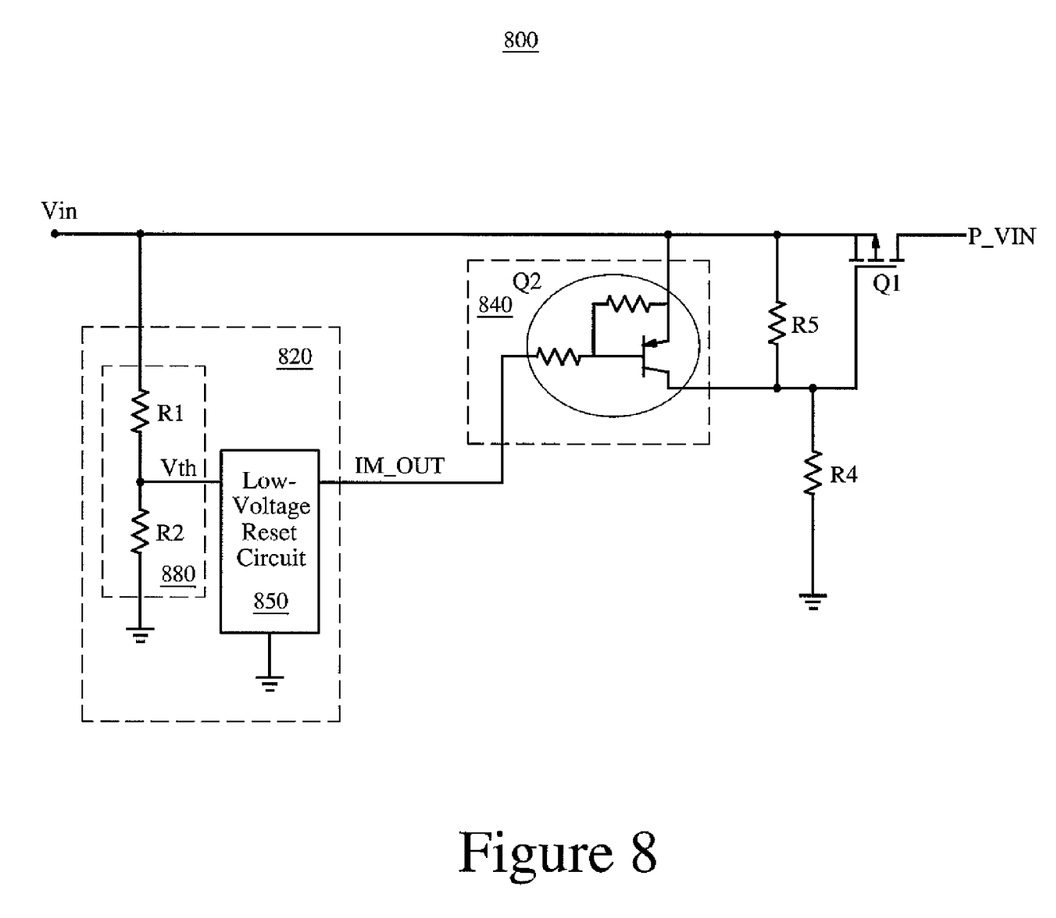
FIG. 8 illustrates a block diagram of yet another embodiment of the circuit of FIG. 1.

FIG. 8 shows a block diagram of an embodiment of circuit 700, which may be employed as an embodiment of circuit 100 of FIG. 1. Circuit 800 is similar to circuit 500 of FIG. 5, except that there is no regulator in circuit 800.

Figure 9:
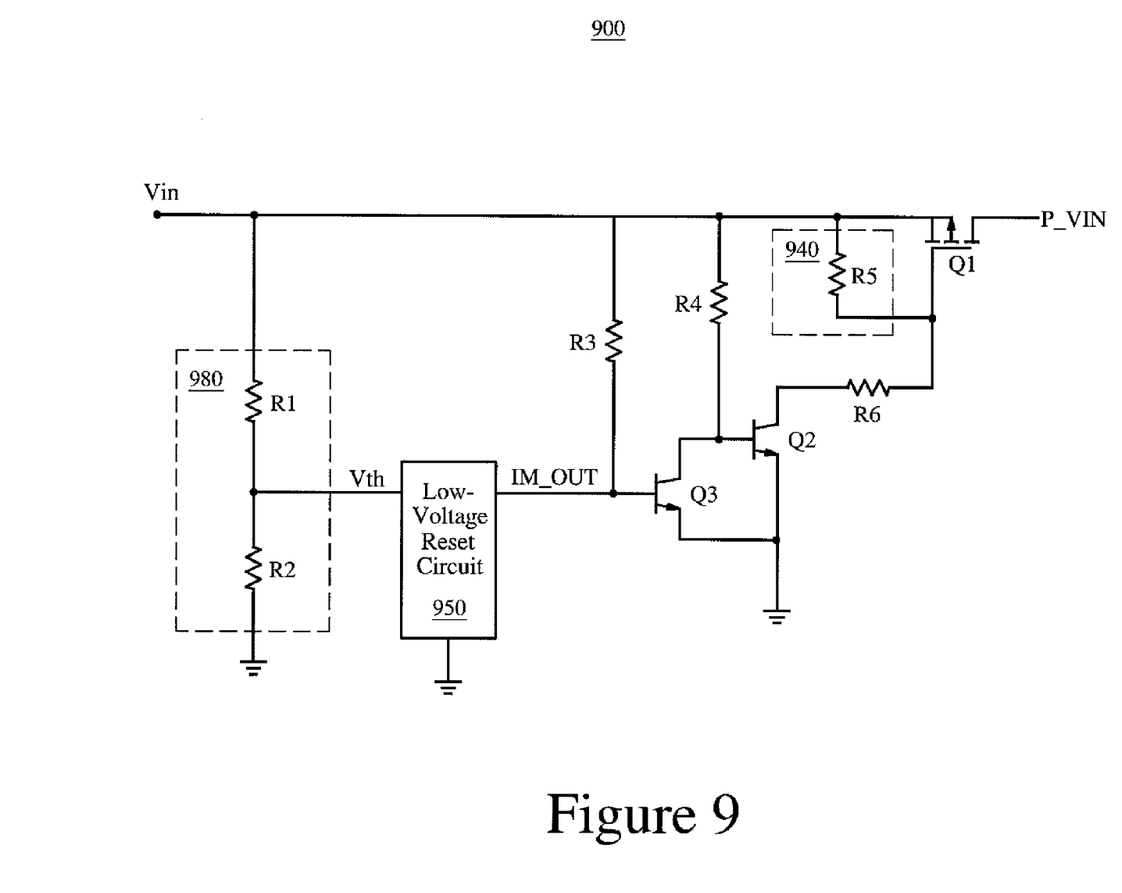
FIG. 9 shows a block diagram of yet another embodiment of the circuit of FIG. 1, arranged in accordance with aspects of the present invention.

FIG. 9 shows a block diagram of an embodiment of circuit 900, which may be employed as an embodiment of circuit 100 of FIG. 1. Switch or resistor 940 includes resistor R12.

When low-voltage reset circuit 950 leaves the reset state, signal IM_OUT is an open drain output, which turns transistor Q3 on, which in turn shuts off transistor Q2, which in turn shuts off transistor Q1. This in turn causes resistor R5 to pull the gate of input transistor Q1 to VIN, so that resistor R5 shorts the gate of input transistor Q1 to the source of input transistor Q1 when transistor Q2 is off.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for transient voltage protection, comprising:
   an input transistor having at least a gate, a drain, and a source, wherein source of the input transistor is coupled to an input node, and wherein the drain of the input transistor is coupled to a protected input node;
   a voltage divider having at least: an input that is coupled to the input node, and an output; and
   a low-voltage reset circuit having at least an input that is coupled to the output of the voltage divider, wherein the low-voltage reset circuit is arranged to cause the gate of the input transistor and the source of the input transistor to short together if the low-voltage reset circuit is not in a reset state, wherein the low-voltage reset circuit is arranged to provide an output signal; the low-voltage reset circuit is in a reset state when a voltage at the input of the low-voltage reset circuit is below a pre-determined value, as adjusted by hysteresis; and wherein the low-voltage reset circuit is arranged to leave the reset state when the voltage at the input of the low-voltage reset circuit is above the pre-determined value, as adjusted by hysteresis.

2. The circuit of claim 1, wherein the input transistor is a p-type metal oxide semiconductor field effect transistor (PMOSFET).

3. The circuit of claim 1, further comprising an alternator that is coupled to the input node.

4. The circuit of claim 1, wherein the input node is an automotive battery line.

5. The circuit of claim 1, wherein the low-voltage reset circuit is a relatively small three-pin integrated circuit that is capable of operating with an operating voltage of one voltage or less and of operating with an operating current of 10 microamps or less, wherein the low-voltage reset circuit includes an integrated voltage reference and an integrated comparator with hysteresis.

6. The circuit of claim 1, further comprising:
a voltage regulator controller having at least a voltage input, and an output, wherein the voltage input of the voltage regulator controller is coupled to the protected input node.

7. The circuit of claim 1, further comprising:
a switch that is coupled between the gate of the input transistor and the source of the input transistor, wherein the low-voltage reset circuit is arranged to cause the gate of the input transistor and the source of the input transistor to short together by closing the switch if the low-voltage reset circuit is not in a reset state.

8. The circuit of claim 7, wherein the low-voltage reset circuit is arranged to cause the switch to close if the low-voltage reset circuit is not in a reset state, such that the gate of the input transistor is shorted to the source of the input transistor if the low-voltage reset circuit is not in a reset state, and wherein the low-voltage reset circuit is arranged to cause the switch to be open if the low-voltage reset circuit is in the reset state, such that the gate of the input transistor is not shorted to the source of the input transistor if the low-voltage reset circuit is in a reset state.

9. The circuit of claim 1, wherein the low-voltage reset circuit is an active-low low-voltage reset circuit, wherein the low-voltage reset circuit is arranged to provide the output signal at a voltage corresponding to a logic low if the low-voltage reset circuit is in a reset state, and to provide the output signal as an open-drain, high-impedance output if the low voltage reset circuit is not in a reset state.

10. The circuit of claim 1, wherein the low-voltage reset circuit is an active-high low-voltage reset circuit, wherein the low-voltage reset circuit is arranged to provide the output signal at a voltage corresponding to a logic low if the low-voltage reset circuit is not in a reset state, and to provide the output signal as an open-drain, high-impedance output if the low voltage reset circuit is in a reset state.

11. The circuit of claim 1, wherein the pre-determined value is 3.0 Volts.

12. The circuit of claim 11, wherein the hysteresis is about 0.1 V, such that the low-voltage reset circuit is arranged to leave the reset state when the voltage at the input of the low-voltage reset circuit is above about 3.1 V.

13. A method for transient voltage protection, comprising:
employing a low-voltage reset circuit to monitor an input voltage;
receiving the input voltage at a drain of an input transistor; and
if the low-voltage reset circuit is not in a reset state, shorting the drain of the input transistor to a gate of the input transistor, wherein the low-voltage reset circuit is arranged to cause the gate of the input transistor and the source of the input transistor to short together if the low-voltage reset circuit is not in a reset state, wherein the low-voltage reset circuit is arranged to provide an output signal; the low-voltage reset circuit is in a reset state when a voltage at the input of the low-voltage reset circuit is below a pre-determined value, as adjusted by hysteresis; and wherein the low-voltage reset circuit is arranged to leave the reset state when the voltage at the input of the low-voltage reset circuit is above the pre-determined value, as adjusted by hysteresis.

14. The method of claim 13, wherein
employing the low-voltage reset circuit to monitor the input voltage includes:
employing a voltage divider to provide a threshold voltage from the input voltage; and
providing the threshold voltage to an input of the low-voltage reset circuit.

15. The method of claim 13, wherein the input transistor is a p-type metal oxide semiconductor field effect transistor (PMOSFET).

16. A circuit for transient voltage protection, comprising:
an input transistor having at least a gate, a drain, and a source, wherein source of the input transistor is coupled to an input node, and wherein the drain of the input transistor is coupled to a protected input node;
a voltage divider having at least: an input that is coupled to the input node, and an output; and
a low-voltage reset circuit having at least an input that is coupled to the output of the voltage divider, wherein the low-voltage reset circuit is arranged to cause the gate of the input transistor and the source of the input transistor to short together if the low-voltage reset circuit is not in a reset state, wherein the low-voltage reset circuit is arranged to provide an output signal; the low-voltage reset circuit is in a reset state when a voltage at the input of the low-voltage reset circuit is below a pre-determined value; and wherein the low-voltage reset circuit is arranged to leave the reset state when the voltage at the input of the low-voltage reset circuit is above the pre-determined value.

* * * * *

UNITED STATES PATENT AND TRADEMARK OFFICE
CERTIFICATE OF CORRECTION

PATENT NO. : 7,660,090 B1
APPLICATION NO. : 11/845678
DATED : February 9, 2010
INVENTOR(S) : Kevin Michael Daugherty It is certified that error appears in the above-identified patent and that said Letters Patent is hereby corrected as shown below:

On the title page, in Item 56, in column 2, under "Other Publications", line 10, delete "Corportion," and insert -- Corporation, --, therefor.

In column 3, line 59, after "close" insert -- . --.

In column 6, line 2, delete "low voltage" and insert -- low-voltage --, therefor.

In column 7, line 32, in claim 9, delete "low voltage" and insert -- low-voltage --, therefor.

In column 7, line 39, in claim 10, delete "low voltage" and insert -- low-voltage --, therefor.

Signed and Sealed this

Thirteenth Day of April, 2010

David J. Kappos
*Director of the United States Patent and Trademark Office*